United States Patent
Li et al.

(10) Patent No.: US 8,842,342 B2
(45) Date of Patent: *Sep. 23, 2014

(54) METHOD AND SYSTEM FOR ISOLATED HOLE DETECTION AND GROWTH IN A DOCUMENT IMAGE

(75) Inventors: Xing Li, Webster, NY (US); Zhenhuan Wen, Pittsford, NY (US); Amal Malik, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 165 days.

This patent is subject to a terminal disclaimer.

(21) Appl. No.: 13/547,670

(22) Filed: Jul. 12, 2012

(65) Prior Publication Data

US 2014/0016819 A1 Jan. 16, 2014

(51) Int. Cl.
*H04N 1/40* (2006.01)
*G06T 5/00* (2006.01)
*H04N 1/46* (2006.01)

(52) U.S. Cl.
USPC ....... 358/3.22; 358/3.26; 358/3.23; 358/3.04; 358/533

(58) Field of Classification Search
USPC .............. 358/1.9, 2.1, 3.01–3.06, 3.13–3.14, 358/3.19, 3.22–3.24, 3.26, 534–536; 382/163, 275; 670/1.9, 2.1, 3.01–3.06, 670/3.13–3.14, 3.19, 3.22–3.24, 3.26, 670/534–536

See application file for complete search history.

(56) References Cited

U.S. PATENT DOCUMENTS

| | | | |
|---|---|---|---|
| 5,634,088 A | 5/1997 | Banton | |
| 5,659,399 A | 8/1997 | Lin et al. | |
| 5,859,955 A | 1/1999 | Wang | |
| 6,332,044 B1 | 12/2001 | Loce et al. | |
| 6,389,163 B1 | 5/2002 | Jodoin et al. | |
| 7,406,210 B2 | 7/2008 | Handley et al. | |
| 2006/0197992 A1 | 9/2006 | Wang | |
| 2007/0091369 A1 | 4/2007 | Liu et al. | |
| 2007/0201097 A1 | 8/2007 | Anderson et al. | |
| 2008/0310748 A1 | 12/2008 | Arai et al. | |
| 2012/0162719 A1 | 6/2012 | Klaus | |

OTHER PUBLICATIONS

Notice of allowance mailed Nov. 8, 2013, in copending Application No. 13547839 (18 pages).

*Primary Examiner* — Barbara Reinier
(74) *Attorney, Agent, or Firm* — Pillsbury Winthrop Shaw Pittman, LLP

(57) ABSTRACT

A method for detecting and growing isolated holes in a document image having a plurality of pixels is provided. The method includes isolating the pixels of the image to form a plurality of windows, each window having a target pixel; identifying a hole growth factor to grow an isolated hole in the received image; using the hole growth factor to identify tiered pixel patterns from a plurality of predefined, tiered pixel patterns, wherein each of the tiered pixel patterns having a predetermined hole growth factor; comparing the pixels within each window to the pixel patterns within the identified tier to identify a match between the pixels within the window and at least one of the pixel patterns; and changing a pixel value of the target pixel, when a match is identified, to grow the isolated hole by the hole growth factor.

12 Claims, 10 Drawing Sheets

METHOD AND SYSTEM FOR ISOLATED HOLE DETECTION AND GROWTH IN A DOCUMENT IMAGE

CROSS REFERENCE TO RELATED APPLICATION

The following co-pending applications, U.S. application Ser. No. 13/547,738, filed Jul. 12, 2012, now U.S. Pat. No. 8,804,200, titled "Method And System For Isolated Dot Detection And Growth In A Document Image," U.S. application Ser. No. 13/547,765, filed Jul. 12, 2012, now U.S. Pat. No. 8,670,157, titled "Dot Growth System And Method," U.S. application Ser. No. 13/547,802, filed Jul. 12, 2012, now U.S. Pat. No. 8,810,859, titled "Dot Growth System And Method," U.S. application Ser. No. 13/547,839, filed Jul. 12,2012, now U.S. Pat. No. 8,665,499, titled "Isolated Hole Detection And Growth," and U.S. application Ser. No. 13/547,875, filed Jul. 12, 2012, now U.S. Pat. No. 8,643,905, titled "Isolated Hole Detection And Growth," are assigned to the same assignee of the present application. The entire disclosure of these co-pending applications is incorporated herein by reference in its entirety.

BACKGROUND

1. Field

The present disclosure relates to a system and a method for detecting and growing isolated holes in a document image.

2. Description of Related Art

One common problem seen on xerographic marking engines is the inability to consistently or uniformly print small, isolated dots, for example, in binary bitmaps of an image. This causes image quality defects such as missing highlight tone and dotted lines. The same problem exists at the other end of the spectrum. Often in very high density regions, isolated holes cannot be reproduced by marking engines due to dot size or gain, making gray levels indistinguishable, causing image quality defects. To deal with marking engines of different characteristics, finer control of density adjustment is needed that can avoid inconsistent outputting of a single isolated dot or hole in an output image.

SUMMARY

According to one aspect of the present disclosure, a computer-implemented method for detecting and growing isolated holes in a document image having a plurality of pixels is provided. The method is implemented in a computer system comprising one or more processors configured to execute one or more computer program modules. The method includes receiving a document image having a plurality of pixels therein; isolating the pixels of the received image to form a plurality of windows, each window having a target pixel and a plurality of pixels surrounding the target pixel; detecting an isolated hole in the received image; identifying a hole growth factor to grow the detected isolated hole in the received image; using the hole growth factor to identify tiered pixel patterns from a plurality of predefined, tiered pixel patterns, wherein each of the tiered pixel patterns having a predetermined hole growth factor; comparing the pixels within each window to the pixel patterns within the identified tier to identify a match between the pixels within the window and at least one of the pixel patterns; and changing a pixel value of the target pixel, when a match is identified, to grow the detected isolated hole in the image by the hole growth factor.

According to another aspect of the present disclosure, a system for detecting and growing isolated holes in a document image having a plurality of pixels is provided. The system includes an image input device and a processor. The image input device is configured for receiving a document image having a plurality of pixels therein. The processor is configured for isolating the pixels of the received image to form a plurality of windows, each window comprising a target pixel and a plurality of pixels surrounding the target pixel; detecting an isolated hole in the received image; identifying a hole growth factor to grow the detected isolated hole in the received image; using the hole growth factor to identify tiered pixel patterns from a plurality of predefined, tiered pixel patterns, wherein each of the tiered pixel patterns having a predetermined hole growth factor; comparing the pixels within each window to the pixel patterns within the identified tier to identify a match between the pixels within the window and at least one of the pixel patterns; and changing a pixel value of the target pixel, when a match is identified, to grow the detected isolated hole in the image by the hole growth factor.

Other objects, features, and advantages of one or more embodiments of the present disclosure will seem apparent from the following detailed description, and accompanying drawings, and the appended claims.

BRIEF DESCRIPTION OF THE DRAWINGS

Various embodiments will now be disclosed, by way of example only, with reference to the accompanying schematic drawings in which corresponding reference symbols indicate corresponding parts, in which.

DETAILED DESCRIPTION

Figure 1:
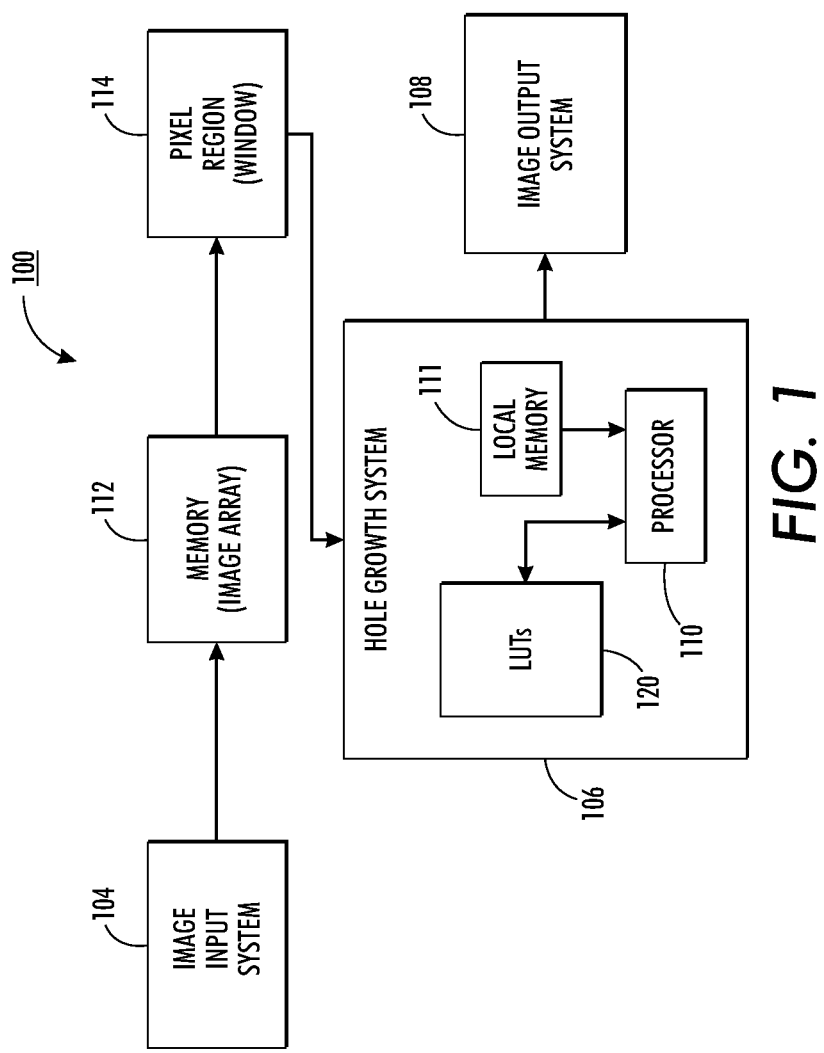
FIG. 1 illustrates a system for detecting and growing isolated holes in a document image in accordance with an embodiment of the present disclosure.

As used in this disclosure, an "image" is a pattern of physical light. An image may include characters, words, and text as well as other features such as graphics, including pictures. An image may be divided into "segments," each of which is itself an image. A segment of an image may be of any size up to and including the whole image.

An item of data can be used to define an image when the item of data includes sufficient information to produce the image. For example, a two-dimensional array can define all or any part of an image, with each item of data in the array providing a value indicating the color of a respective location of the image. Likewise, one or more "scanlines" can be used to define an image. A scanline divides an image into a sequence of (typically horizontal) strips. A scanline can be further divided into discrete pixels for processing in a computer, xerographic, or printing system. A scanline may include a plurality of pixels. This ordering of pixels by rows is known as raster order, or raster scan order.

Each location in an image may be called a "pixel." In an array defining an image in which each item of data provides a value, each value indicating the color of a location may be called a "pixel value." Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image. A "central pixel" is not literally the center pixel in a region, rather the term describes a target pixel in a scanline being a single pixel or having a plurality of pixels. It will be appreciated that many or all of the pixels become the "target" pixel during the process of enhancing an entire image. Generally, the pixels make up individual features of the image. A binary pixel can take on two values: a 1 or 0. 1 meaning ON and 0 meaning OFF. Specifically, one or more pixels that are ON and are contiguous or in close vicinity of each other define one or more dots that are to be printed by a printing device. Similarly, one or more pixels that are OFF and are contiguous or in close vicinity of each other define one or more holes that are to be printed by a printing device. The illustrated aspects of this disclosure relate generally to a system and a method for detecting and growing isolated holes in a document image to be printed by the printing device. In some aspects of the disclosure, one or more pixels may make a hole, e.g., an isolated hole as described herein.

A pixel may turned to a "ON state." The "ON state" of a pixel is defined with respect to the pixel having a binary logic level higher than that of a pixel with a lower binary logic level. For example, a pixel that is at a "1" level is in a turned ON state as compared to a pixel at a '0' binary level or an OFF state. The ON and OFF states of the pixels can be stored in a register in a memory device, although forms of physical storage may be used.

The ON states of the pixels generally define one or more dots that are to be outputted by the image output device, while the OFF states of the pixels generally define one or more holes that are to be outputted by the image output device. As will be clear from the discussion below, a high binary value (e.g., "1") of the pixel indicates that the pixel is enabled for outputting (printing and/or displaying) by the image output device, and a low binary value (e.g., "0") of the pixel indicates that the pixel will not be printed or displayed in an output image outputted by the image output device.

The term "data" refers herein to physical signals that indicate or include information. When an item of data can indicate one of a number of possible alternatives, the item of data has one of a number of "values." For example, a binary item of data, also referred to as a "bit," has one of two values, interchangeably referred to as "1" and "0" or "ON" and "OFF" or "high" and "low." The term "data" includes data existing in any physical form, and includes data that are transitory or are being stored or transmitted. For example, data could exist as electromagnetic or other transmitted signals or as signals stored in electronic, magnetic, or other form.

An item of data relates to a part of an image, such as a pixel or a larger segment of the image, when the item of data has a relationship of any kind to the part of the image. For example, the item of data could define the part of the image, as a pixel value defines a pixel; the item of data could be obtained from data defining the part of the image; the item of data could indicate a location of the part of the image; or the item of data could be part of a data array such that, when the data array is mapped onto the image, the item of data maps onto the part of the image.

An "image input device" is a device that can receive an image and provide an item or items of data defining a version of the image. A desktop "scanner" is an example of an image input device that receives an image by a scanning operation, such as by scanning a document. Scanning is carried out using, for example, a scanning bar in the image input device. The scanning bar scans the input image on a line by line basis. The direction in which the scanning bar scans the image is termed as a "fast scan" direction at the beginning of each scanline of the image. A second direction is termed as a "slow scan" direction that corresponds to a direction of movement of a printable medium (e.g., sheet(s) of printing paper) storing the image. The adjectives "fast" and "slow" refer to relative speed of movement of the scan bar and the printable medium.

An "image output device" is a device that can receive an item of data defining an image and provide the image as output. A "display" and a "laser printer" are examples of image output devices that provide the output image in human viewable form, although any type of printing device known to one of ordinary skill in the art may be used. The visible pattern presented by a display is a "displayed image" or simply "image" while the visual pattern rendered on a substrate by the printer is a "printed image." The output image is printed using movement of one or more components in the image output device.

"Circuitry" or a "circuit" is any physical arrangement of matter that can respond to a first signal at one location or time by providing a second signal at another location or time. Circuitry specifically includes logic circuits existing as interconnected components, programmable logic arrays (PLAs) and application specific integrated circuits (ASICs). Circuitry "stores" a first signal when it receives the first signal at one time and, in response, provides substantially the same signal at another time. Circuitry "transfers" a first signal when it receives the first signal at a first location and, in response, provides substantially the same signal at a second location.

"Memory circuitry" or "memory" is any circuitry that can store data, and may include local and remote memory and input/output devices. Examples include semiconductor ROMs, EPROMs, EEPROMs, RAMs, and storage medium access devices with data storage media that they can access. A "memory cell" is memory circuitry that can store a single unit of data, such as a bit or other n-ary digit or an analog value.

"User input circuitry" or "user interface circuitry" is circuitry for providing signals based on actions of a user. User input circuitry can receive signals from one or more "user input devices" that provide signals based on actions of a user, such as a keyboard, a mouse, a joystick, a touch screen, and so forth. The set of signals provided by user input circuitry can therefore include data indicating mouse operation, data indicating keyboard operation, and so forth. Signals from user input circuitry may include a "request" for an operation, in which case a system may perform the requested operation in response.

For purposes of this disclosure, and not by way of limitation, an "isolated hole" is generally defined as a hole that satisfies one or more criteria such as how close that hole is to the nearest pixel or group of pixels corresponding to another hole. Similarly, an isolated hole may be defined as a hole that has a threshold number of holes surrounding that hole that are enabled for printing as a hole. Other criteria for defining an isolated hole may be used too. The system may be generically considered a printing system having an input image that is processed for printing or displaying as an output image. The input image has an input density of holes with one or more pixels in an OFF state making up the input image. Correspondingly, the output image has an output density or a desired density of holes making up the output image. Typically, input and output densities are different since input density of holes is optimized for removing artifacts to result in the output density of holes.

"Hole growth" generally refers to a process in which a size of an isolated hole that does not meet a predetermined size criteria suitable for outputting is increased. For example, such increase in size may be reflected by selecting one or more pixels in a neighborhood of the detected hole and disabling those pixels for outputting or printing.

The present disclosure proposes a method and a system for detecting and growing isolated holes in a binary bitmap. The method and the system uses tiered template matching in a context window (e.g., 5×5 binary window) to find isolated holes and then growing the holes when isolated OFF pixels are found. The system has the capability of growing isolated holes to a programmable minimum size. For example, the system has the ability to grow holes to a two, three or four OFF pixelsminimum size. Using a set of multi-tiered templates, the proposed method achieves multiple-pixel growth while maintaining the cost effective scheme of operating on one pixel at each clock cycle. The system, thus, provides a simple and effective way to remove isolated holes from an image. The tiered templates of the system are augmented by a set of programmable masks which indicate the "don't care" bits.

FIG. 1 illustrates a system 100 for detecting and growing isolated holes in a document image in accordance with an embodiment of the present disclosure. The system 100 includes an image input system 104, a hole growth system 106, and an image output system 108. The hole growth system 106 may include a processor 110, pattern matching lookup table(s) 120 and a local memory 111.

The system 100 is configured to process an input digital image generated and/or provided by the input image system 104 to optimize growth of isolated holes therein. By way of example only, input image can be provided as a plurality of binary data signals representing, for example, the text, halftone and graphic image regions that make up a source document from with the input image was generated, or is being generated in real-time. That is, the input image may be produced as a digitized representation of a hardcopy document, for example, by scanning on a scanner. As illustrated in FIG. 1, the source of the digital image (interchangeably referred to herein as "input image") may be any input image terminal, where the image is passed to or stored in the memory 112. The memory 112 may be suitable for the storage of the entire image or it may be designed to store only a portion of the image data (e.g., several rasters or fast-scan lines). More specifically, the memory 112 stores data that is representative of the imaging areas in the digital image. The memory 112 can comprise computer readable media, namely computer readable or processor readable storage media, which are examples of machine-readable storage media. Computer readable storage/machine-readable storage media can include volatile, nonvolatile, removable, and non removable media implemented in any method or technology for storage of information, e.g., computer readable/machine-executable instructions, data structures, program modules, or other data, which can be obtained and/or executed by one or more processors.

The memory 112 is a generic term and it may comprise a single memory or a plurality of separate memories. Such memories refer to computer readable media, and may be of the type that are removable from the camera, or of the type that are integrated into the input image terminal or system 104 (e.g., a camera). Examples of such memory may include, but are not limited to flash memory, USB thumb drives, a memory stick, CDs, DVDs or other optical recording media, floppy disks or other magnetic recording media, or any other type of memory now known or later developed. Where the memory 112 includes a single memory, the input image may be stored separately in the memory 112. Likewise, the lower resolution images could be stored to a first memory and the higher resolution images could be stored to a physically separate second memory.

The data may be extracted from the memory 112 on a raster basis or on a pixel-by-pixel basis for use by the subsequent components or steps. More specifically, a pixel region window block 114 serves to select some or all pixels within a region of the image (accesses or extracts from the memory 112), so as to make the data for the respective pixels available for processing. It will be appreciated that while described as a static system, the disclosed embodiment is intended to continuously operate on pixel data in a "streaming" fashion, and that the window 114 may be any suitable apparatus or methodology that allows access to a plurality of pixels.

As described herein, the window 114 determines different regions of the digital image, the regions including a plurality of imaging areas. Such regions are suitable for optimizing and controlling growth of isolated holes therein. According to one aspect of the disclosure, such windowing may include a plurality of fast-scan data buffers, wherein each buffer contains a plurality of registers or similar memory cells for the storage of image data therein, with the data being clocked or otherwise advanced through the registers. The number of registers is dependent upon the "horizontal" (fast-scan) window size and/or line width, whereas the number of buffers is dependent upon the "vertical" (slow-scan) window size. As will be appreciated, the window size is dependent upon a context, as discussed in FIG. 2 below, that is required to implement the particular image adjustment desired and the level of addressability of the imaging areas (higher levels of addressability will inherently result in more data stored to provide the required context). While one windowing technique has been generally described, it will be appreciated that similar means may be implemented using hardware and/or software to point/access a memory device, so that data for selected imaging areas may be accessed, rather than having the data separately stored in a buffer. It will also be appreciated that alternative configurations may be employed for the buffer. For example, a single, long, buffer may be employed, where image data is simply clocked through the buffer. Thus the various alternatives all employ some form of memory for storing image data representing image areas in at least one region of the image.

Output from the window 114 is provided to the hole growth system 106. The hole growth system 106 includes the processor 110, the pattern matching LUTs 120, the local memory 111, and other logic circuitry (not shown). In one alternative aspect of this disclosure, the LUTs 120 may be a part of the local memory 111. The hole growth system 106 carries out various functions and methods related to detection and growth of isolated holes in an input image provided by the input image system 104, and received as a bitmap of pixels from the window 114. By way of example only, and not by way of limitation, the processor 110 can be conveniently implemented using one or more general purpose computer systems, microprocessors, digital signal processors, microcontrollers, application specific integrated circuits (ASIC), programmable logic devices (PLD), field programmable logic devices (FPLD), field programmable gate arrays (FPGA) and the like, programmed according to the teachings as described and illustrated herein, as will be appreciated by those skilled in the computer, software and networking arts. For example, the processor 110 can be an Intel® processor provided by Intel Corporation, Santa Clara, Calif. Further, although a single processor is illustrated, more than one processors coupled by a bus may be used. The local memory 111 is similar to the memory 112 and therefore, structure of the local memory 111 is not being described in detail.

After processing at the hole growth system 106 (e.g., using the processor 110), input image transformed into an output image for printing and/or displaying at the image output system 108. When displaying, the image output system 108 comprises a display unit (not shown) for output image, although in alternative embodiments, the image output system 108 could also print the output image (e.g., when the image output system 108 is at a print end of a copier). As will be appreciated, additional look-up tables, as well as storage and logic circuitry may be used for producing the output image.

Figure 2:
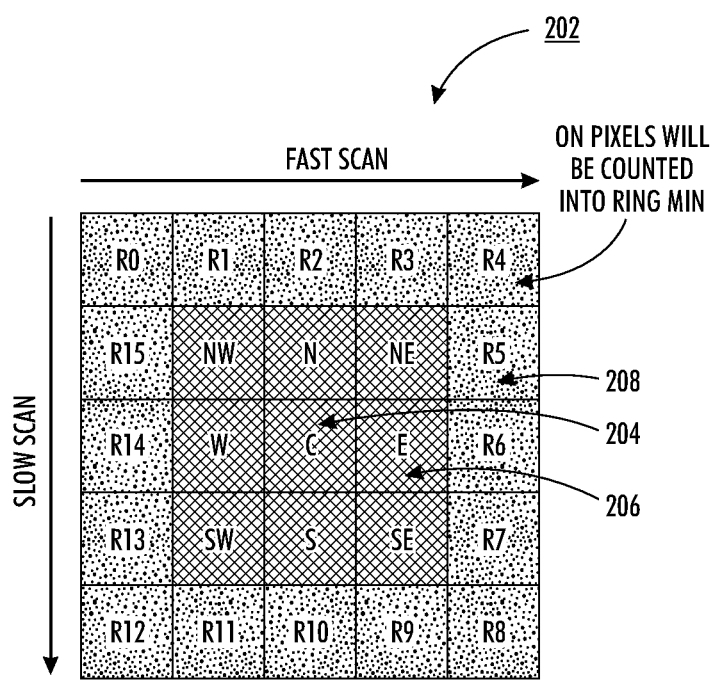
FIG. 2 illustrates a context window in accordance with an embodiment of the present disclosure.

Referring to FIG. 2, a context window 202 with respect to a fast scan and a slow scan direction is shown. In the illustrated embodiment, the context window 202 is 5×5 binary video. The context window 202 includes a center or a target pixel 204 and a plurality of pixels 208 surrounding or in the neighborhood of target pixel 204. A center pixel is not literally the center pixel in a region, rather the term could describe a target pixel in a scanline having a plurality of pixels.

In one embodiment, the context window 202 is a part of an input image that comprises a plurality of scanlines that are further made of a plurality of context windows, similar to the context window 202. Pixels shown in the context window 202 can be represented by at least one binary value ("0" or "1"). As noted above, a high binary value (e.g., "1") indicates that the pixel is enabled for outputting (printing and/or displaying), and a low binary value (e.g., "0") indicates that the pixel will not be printed or displayed in an output image outputted by the image output system 108 (described and shown with respect to FIG. 1). Therefore, the context window 202 may be represented as one comprising a bitmap of binary values stored, for example, in a register in the memory 112.

In the example shown in FIG. 2, the context window 202 includes an inner 3×3 pixel ring 206 where pixels are denoted as "N," "S," "E," "W," "NE," "NW," "SE," and "SW" in terms of their location relative to the target or center pixel 204. Also, the context window 202 includes an outer 5×5 pixel ring 208 where pixels are denoted as "R0," "R1," "R2," "R3," "R4," "R5," "R6," "R7," "R8," "R9," "R10," "R11," "R12," "R13," "R14," and "R15" in terms of their location relative to the target or center pixel 204.

In one embodiment, the pixels from the inner ring 206 and the outer ring 208 of the 5×5 context window are arranged in an 24-bit array as {NW, N, NE, W, E, SW, S, SE, R15, R14, R13, R12, R11, R10, R9, R8, R7, R6, R5, R4, R3, R2, R1, R0}, although other orderings of pixels may be used. By way of example only, the 24-bit array may be stored in a register of the memory 112.

Figure 3:
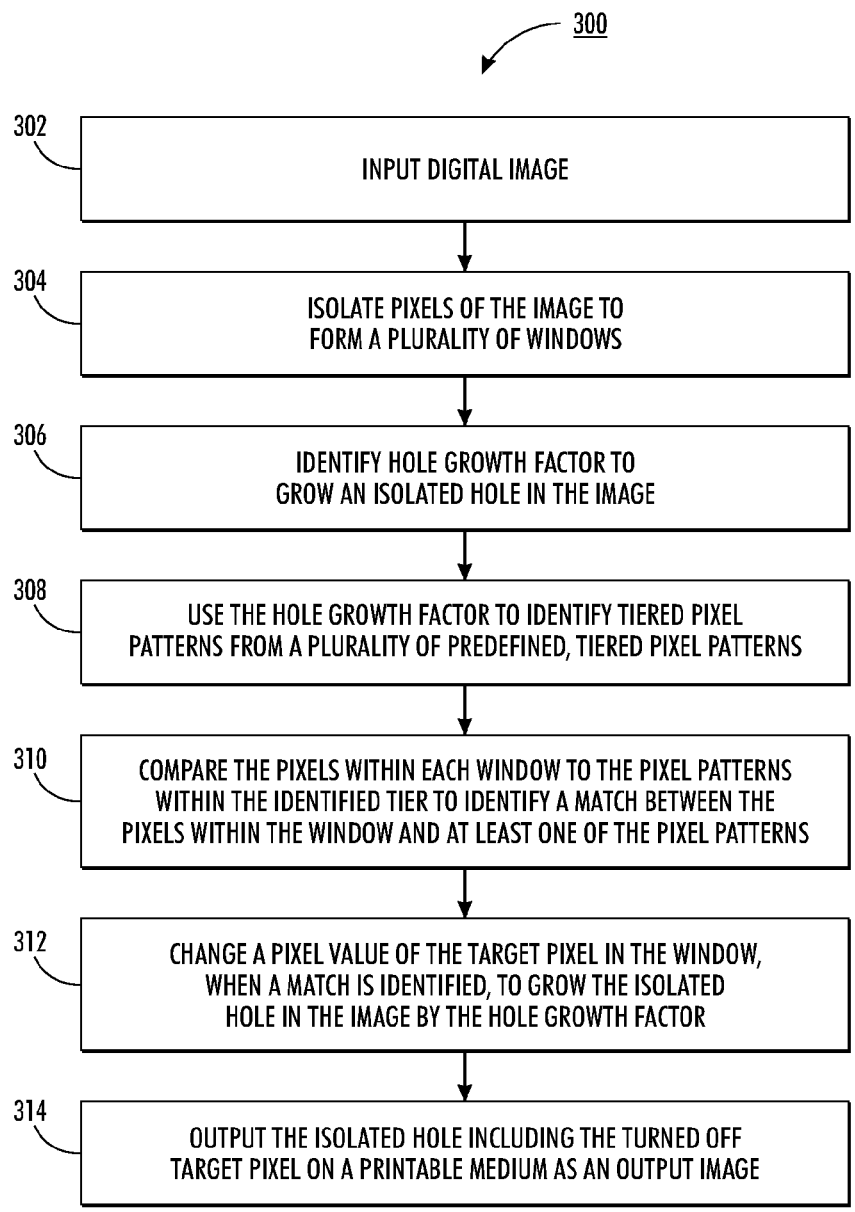
FIG. 3 illustrates a method for detecting and growing isolated holes in a document image in accordance with an embodiment of the present disclosure.

FIG. 3 illustrates a computer-implemented method 300 for detecting and growing isolated holes in a document image in accordance with an embodiment of the present disclosure.

The exemplary method 300 is executed by the system 100 according to an aspect of this disclosure. The various functions of the elements of the system 100 may be controlled by a central microprocessor (e.g., processor 110), and the instructions to carry out the exemplary methodology may be embedded in a chip, or may be loaded into a memory associated with the microprocessor as software. That is, the method 300 is implemented in a computer system comprising one or more processors configured to execute one or more computer program modules. The particular manner in which the elements of the system 100 are controlled and the method is performed is not particularly critical, and other control structure or architecture may be used for the system 100.

The method 300 is initiated in response to an input digital image at procedure 302. The input image is then processed, at procedure 304, where the pixels in the document image are isolated to form a plurality of context windows (e.g., context window 202 in FIG. 2). As noted above and as shown in FIG. 2, each context window 202 includes the target pixel 204 and the plurality of pixels surrounding the target pixel 204.

Next at procedure 306, a hole growth factor to grow an isolated hole in the received document image is identified. The procedure 306 includes identifying an isolated hole in the received document image. Procedure for identifying an isolated hole in the received document image, for example, is explained in the following co-pending applications, U.S. Ser. No. 13/547,758, titled "Method And System For Isolated Dot Detection And Growth In A Document Image," U.S. Ser. No. 13/547,765, titled "Dot Growth System And Method" and U.S. Ser. No. 13/547,802, titled "Isolated Dot Growth System And Method," U.S. Ser. No. 13/547,839, titled "Isolated Hole Detection And Growth," and U.S. Ser. No. 13/547,875, titled "Isolated Hole Detection And Growth," assigned to the same assignee of the present application. The entire disclosure of these co-pending applications is incorporated herein by reference in its entirety.

The procedure 306 also includes identifying hole growth factor to grow the isolated hole. In one embodiment, the predetermined hole growth factor or the programmable minimum size may be chosen based on the received input image. For example, if the image is too dark or an environment friendly toner saver mode is selected on the user interface by the user, the predetermined hole growth factor can be set to a higher value. Otherwise, the predetermined hole growth factor may be set to a lowest value, for example, two. In one embodiment, the predetermined hole growth factor depends on the ITT (Image Input Terminal) and IOT (Image Output Terminal) as well as the image path. The predetermined hole growth factor or the programmable minimum size may be maintained constant for the entire image. In another embodiment, the predetermined hole growth factor may be changed for different areas of the image.

The predetermined hole growth factor is configured to grow the detected isolated hole by at least two pixel size. For example, the predetermined hole growth factor is configured to grow the detected isolated hole by a two pixel size, a three pixel size or a four pixel size.

The procedures 304 and 306 may be undertaken in any order. That is, in another embodiment, procedures 304 and 306 may be reversed such that a hole growth factor to grow an isolated hole in the received document image is first identified and then pixels in the document image are isolated to form a plurality of context windows.

Next at procedure 308, the identified hole growth factor is used to identify tiered pixel patterns from a plurality of predefined, tiered pixel patterns.

The system 100 includes a plurality of predefined, tiered pixel patterns 450, 550, and 650. The plurality of predefined, tiered pixel patterns 450, 550, and 650 are stored in the local memory 111 or the LUTs 120. As used herein, the term "tiered pixel patterns" refers to a set of predefined pixel patterns within a tier. That is, each tier includes a set of predefined pixel patterns and has a predetermined hole growth factor. In the illustrated embodiment of FIGS. 4-6, three tiers 450, 550, and 650 are shown. However, the number of tiers can vary significantly in number.

Figure 4:
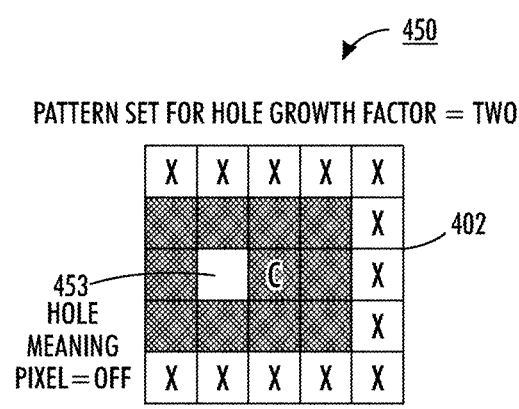
FIG. 4 illustrates a pixel pattern with a hole growth factor of two in accordance with an embodiment of the present disclosure.
Figure 5:
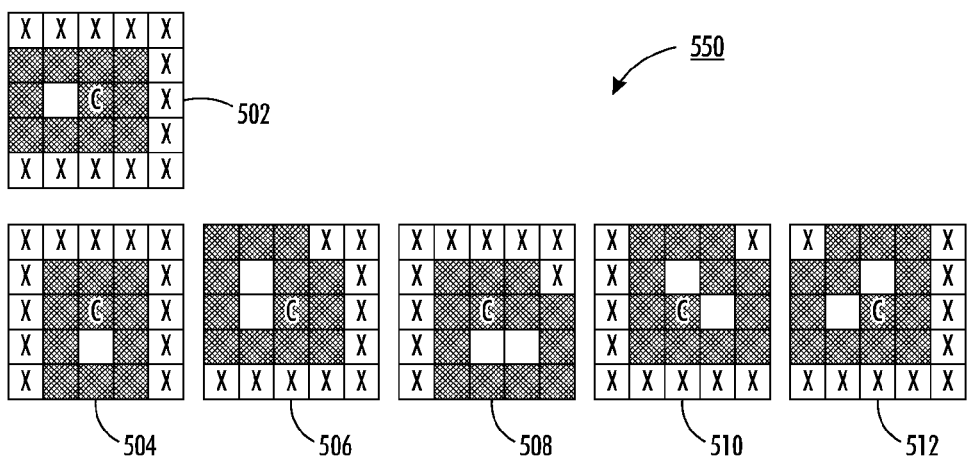
FIG. 5 illustrates pixel patterns with a hole growth factor of three in accordance with an embodiment of the present disclosure.
Figure 6:
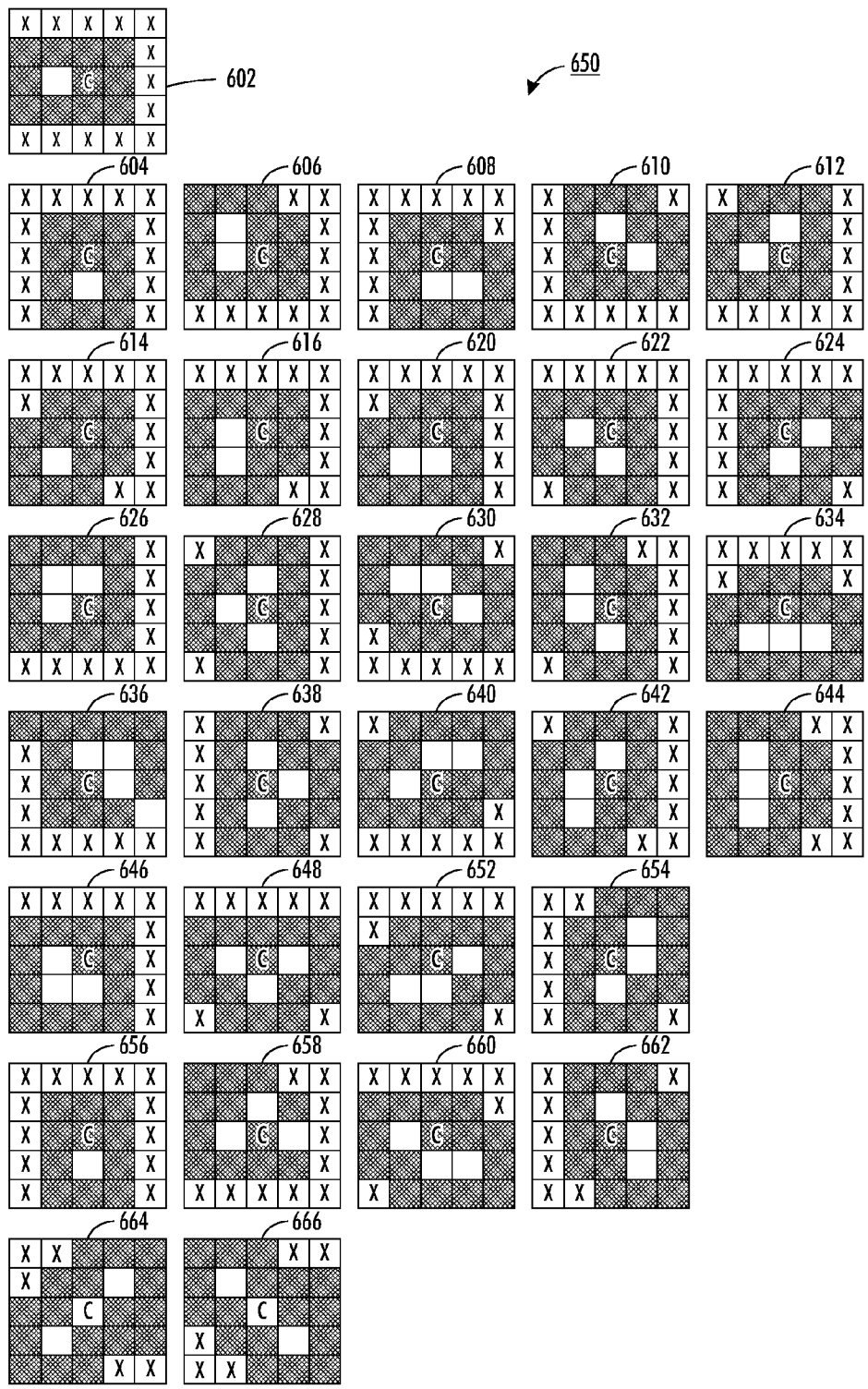
FIG. 6 illustrates pixel patterns with a hole growth factor of four in accordance with an embodiment of the present disclosure.

FIGS. 4, 5 and 6 illustrate pixel pattern(s) with hole growth factors of two, three, and four, respectively, in accordance with an embodiment of the present disclosure. As shown in FIG. 4, a first tier 450 has a hole growth factor of two and has pixel pattern 402. As shown in FIG. 5, a second tier 550 has a hole growth factor of three and has pixel patterns 502-512. As shown in FIG. 6, a third tier 650 has a hole growth factor of four and has pixel patterns 602-666. The pixel patterns within each tier have a predetermined hole growth factor.

In the illustrated embodiment shown in FIGS. 4-6, thirty one 24-bit patterns 402-666 are defined. In one embodiment, the thirty one 24-bit patterns 402-666 may be either hard-coded for simplicity or made programmable for flexibility.

In one embodiment, the pixels of each bit pattern or pixel pattern are also arranged in an 24-bit array as {NW, N, NE, W, E, SW, S, SE, R15, R14, R13, R12, R11, R10, R9, R8, R7, R6, R5, R4, R3, R2, R1, R0}, although other orderings of pixels may be used. By way of example only, the 24-bit array bit pattern or pixel pattern may be stored in a register of the memory 112.

The pixels of the bit patterns in FIGS. 4-6 can be represented by at least one binary value ("0" or "1"). The pixels of the bit patterns in FIGS. 4-6 that are marked "X" are referred to as "don't care" bits. A value of "0" or "1" can be placed in the location where "don't care" ("X") are present in the bit patterns. The pixel of the bit patterns in FIGS. 4-6 that is marked "C" are referred to as "target pixel." The pixels of the bit patterns in FIGS. 4-6 that are represented by dark filled squares or pixels (e.g., 453 in FIG. 4) have a high binary value (e.g., "1"). The pixels of bit patterns in the inner ring of FIGS. 4-6 that are white or OFF "0" represent isolated holes.

In one embodiment, the pixels of the bit pattern 402 of the first tier 450 (FIG. 4) are arranged in an 24-bit array as {1, 1, 1, 0, 1, 1, 1, 1, 1, 1, X, X, X, X, X, X, X, X, X, X, X, X, X, X}.

In one embodiment, the pixels of the bit pattern 502, 504, 506, 508, 510 and 512 of the second tier 550 (FIG. 5) are arranged in 24-bit arrays as {1, 1, 1, 0, 1, 1, 1, 1, 1, 1, 1, 1, X, X, X, X, X, X, X, X, X, X, X, X}, {1, 1, 1, 1, 1, 1, 0, 1, X, X, X, X, 1, 1, 1, X, X, X, X, X, X, X, X, X}, {0, 1, 1, 0, 1, 1, 1, 1, 1, 1, X, X, X, X, X, X, X, X, X, 1, 1, 1}, {1, 1, 1, 1, 1, 1, 0, 0, X, X, X, X, 1, 1, 1, 1, 1, X, X, X, X, X, X}, {1, 0, 1, 1, 0, 1, 1, X, X, X, X, X, X, X, 1, 1, 1, X, 1, 1, 1, X} and {1, 0, 1, 0, 1, 1, 1, 1, 1, 1, X, X, X, X, X, X, X, X, X, 1, 1, 1, X}, respectively.

In one embodiment, the pixel patterns are augmented by a set of programmable masks which indicate the "don't care" bits. One programmable mask is associated with each bit pattern or pixel pattern. That is, there are a total of thirty one programmable mask registers mask [0] through mask [30].

In one embodiment, the pixels of each programmable mask are also arranged in an 24-bit array as {NW, N, NE, W, E, SW, S, SE, R15, R14, R13, R12, R11, R10, R9, R8, R7, R6, R5, R4, R3, R2, R1, R0}, although other orderings of pixels may be used. By way of example only, the 24-bit array programmable mask may be stored in a register of the memory 112. The programmable mask register array is used to flag "don't care" bits in the corresponding bit pattern ("1" for "don't care"). For example, the mask register for the pattern 402 in tier 450 of FIG. 4 is {1, 1, 1, 0, 1, 1, 1, 1, 1, 1, 1, 1, 1, 1, 1, 1, 1, 1, 1, 1, 1, 1, 1, 1}. An OR operation between some bits of the mask register and pixels of the bit pattern such as 502, 504, 506, . . . etc yields all 1s. Typically it's the outer ring {R15, R14, R13, R12, R11, R10, R9, R8, R7, R6, R5, R4, R3, R2, R1, R0}

Next at procedure 310, the pixels within each context window are compared to the pixel patterns within the identified tier to identify a match between the pixels within the window and at least one of the pixel patterns.

At procedure 312, a pixel value of the target pixel is changed, when a match is identified, to grow the isolated hole in the image by the hole growth factor. Changing the pixel value of the target pixel includes turning OFF the target pixel. That is, the center or target pixel is turned OFF if pattern detection result is positive and untouched otherwise. The current pixel "C" will be turned OFF if any of the patterns in the set corresponding to the specified pixel growth factor is detected.

If the programmable hole growth factor is set to one, then there will be no hole growth. That is, the target pixel is untouched, when the programmable hole growth factor is one.

If the programmable hole growth factor is set to two, then the pixels within the context window 202 are checked against pixel pattern 402 of the first tier 450 shown in FIG. 4.

If the programmable hole growth factor is set to three, then the pixels within the context window 202 are checked against pixel patterns 502-512 of the second tier 550 shown in FIG. 5. That is, five additional patterns 504-512, or a total of six patterns 502-512 are checked if the hole growth factor is set to three.

All the pixel patterns 502-512 of the second tier 550 have a hole growth factor of three. The pixel patterns 502-512 of the second tier 550 provide the capability of growing a one-pixel hole and a two-pixels hole to a three-pixels hole. For example, as will be explained below with respect to FIGS. 7A-D, the pixel patterns 502 and 504 of the second tier 550 provide the capability of growing a one-pixel hole to a three-pixels hole. The pixel patterns 506-512 of the second tier 550 provide the capability of growing a two-pixels hole to a three-pixels hole. There will be no holegrowth when the programmable hole growth factor is set to three and a three-pixels hole is there in the context window.

Figure 7A:
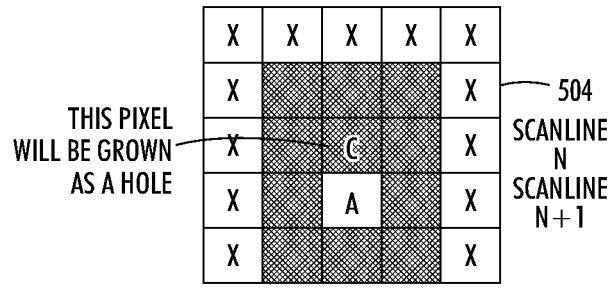
FIGS. 7A-D show pixel patterns in second tier (i.e., having a hole growth factor of three) and the resulting isolated hole grown by these pixel patterns in accordance with an embodiment of the present disclosure.
Figure 7B:
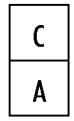
Figure 7C:
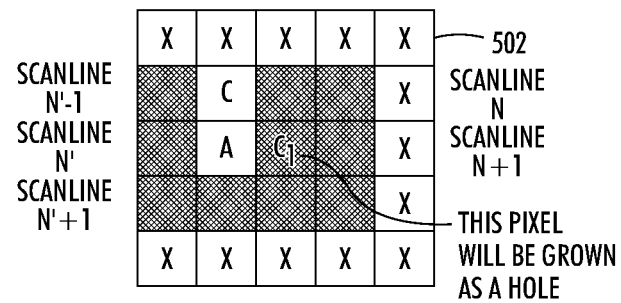
Figure 7D:
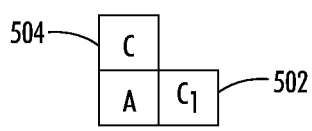

FIGS. 7A-D show pixel patterns 502 and 504 in the second tier 550 and the resulting isolated hole grown by these pixel patterns. FIG. 7A shows pixel pattern 504 in which pixel A (i.e., white square) represents an isolated hole and pixel C represents the current pixel (i.e., a pixel that will be turned OFF for the growth of pixel A as a hole). At scanline N, the current pixel C is turned OFF to provide in a two-pixels hole as shown in FIG. 7B. Referring to FIG. 7C, the pixel C and the pixel A are shown in the second pattern 502 at scanlines N and N+1. FIG. 7C represents three new scanlines N', N'+1, and N'-1, where new current scanline N' is same as scanline N+1 in FIG. 7A and new scanline N'-1 is same as scanline N in FIG. 7A. Pixel $C_1$ in FIG. 7C represents the current pixel at scanline N+1 or scanline N', which is the new current scanline. At scanline N+1 or scanline N', the current pixel $C_1$ is turned OFF to provide in a three-pixels hole as shown in FIG.

7D. Which is the growth of isolated hole at pixel A by a holegrowth factor of 3. The three-pixels hole (shown in FIG. 7D) is, therefore, grown by a combination of two pixel patterns 502 and 504 and over two scanlines N and N+1 (or new scanlines N'−1 and N').

If the programmable hole growth factor is set to four, then the pixels within the context window 202 are checked against pixel patterns 602-666 of the third tier 650 shown in FIG. 6. That is, twenty five more patterns 614-666, or a total of thirty one patterns 602-666 are checked if the hole growth factor is set to four.

All the pixel patterns 602-666 of the third tier 650 have a hole growth factor of four. The pixel patterns 602-666 of the third tier 650 provide the capability of growing a one-pixel hole, a two-pixels hole or a three-pixels hole to a four-pixels hole. For example, as will be explained with respect to FIGS. 8A-F, the pixel patterns 602, 604 and 614 of the third tier 650 provide the capability of growing a one-pixel hole to a four-pixels hole. The pixel patterns 606-624 of the third tier 650 provide the capability of growing two-pixels hole to four-pixels hole. The pixel patterns 626-662 of the third tier 650 provide the capability of growing three-pixels hole to four-pixels hole. There will be no pixel hole growth when the programmable hole growth factor is set to four and a four-pixels hole is present in the context window.

Figure 8A:
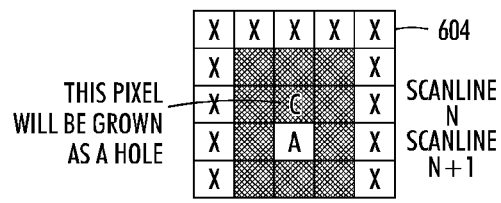
FIGS. 8A-F show pixel patterns in the third tier (i.e., having a hole growth factor of four) and the resulting isolated hole grown by these pixel patterns in accordance with an embodiment of the present disclosure.
Figure 8B:
Figure 8C:
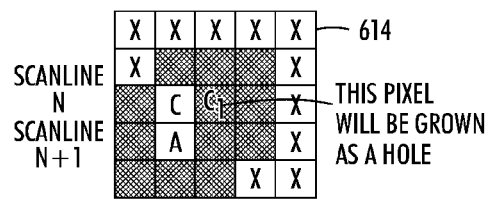
Figure 8D:
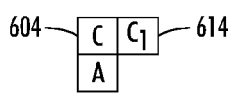
Figure 8E:
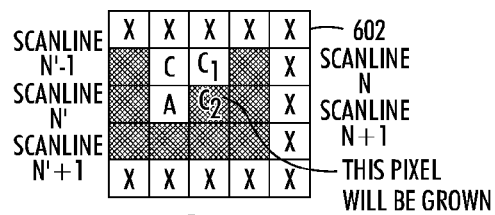
Figure 8F:
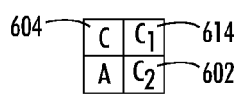

FIGS. 8A-F show pixel patterns 604, 614 and 602 in the third tier 650 and the resulting isolated hole grown (i.e., by the hole growth factor of four) by these pixel patterns. FIG. 8A shows pixel pattern 604 in which pixel A (i.e., white square) represents an isolated hole and pixel C represents the current pixel (i.e., a pixel that will be turned OFF for growth of pixel A as a hole. At scanline N, the current pixel C is grown as a hole to provide in a two-pixels hole as shown in FIG. 8B. Referring to FIG. 8C, the pixel C is shown in the second pattern 614 at scanline N with the pixel A at scanline N+1. Pixel $C_1$ in FIG. 8C represents the new or next current pixel at scanline N. At scanline N, the new current pixel $C_1$ is grown as a hole to provide in a three-pixels hole as shown in FIG. 8D. The three-pixels hole (shown in FIG. 8D) is, therefore, grown by a combination of two pixel patterns 604 and 614 and over one scanline N. FIG. 8E represents three new scanlines N', N'+1, and N'−1, where new current scanline N' is same as scanline N+1 in FIGS. 8A and 8C and new scanline N'−1 is same as scanline N in FIGS. 8A and 8C. Referring to FIG. 8E, the pixel C and the pixel $C_1$ are shown in the pattern 602 at scanline N or at new scanline N'−1 and the pixel A is shown in the pattern 602 at scanline N+1 or at new current scanline N'. Pixel $C_2$ in FIG. 8E represents the current pixel at scanline N+1 or at scanline N', which is the new current scanline. At scanline N+1, the current pixel $C_2$ is grown as a hole to provide in a four-pixels hole as shown in FIG. 8F. The four-pixels hole (shown in FIG. 8F) is, therefore, grown by a combination of three pixel patterns 604, 614 and 602 and over two scanlines N and N+1 (or new scanlines N'−1 and N').

Figure 9A:
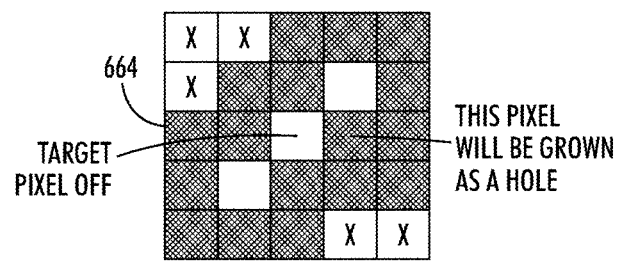
FIGS. 9A and 9B show a pixel pattern in third tier (i.e., having a hole growth factor of four) and the resulting isolated hole grown by this pixel pattern in accordance with an embodiment of the present disclosure.
Figure 9B:
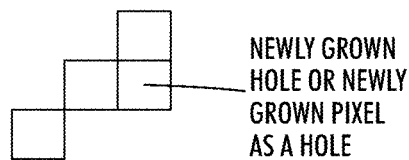
Figure 10A:
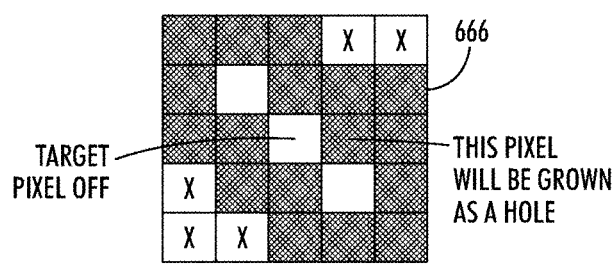
FIGS. 10A and 10B show another pixel pattern in the third tier (i.e., having a hole growth factor of four) and the resulting isolated hole grown by this pixel pattern in accordance with an embodiment of the present disclosure.
Figure 10B:
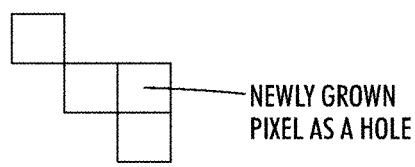

FIGS. 9A and 9B show the pixel pattern 664 and the resulting isolated hole grown by the pixel pattern 664. FIGS. 10A and 10B show the pixel pattern 666 and the resulting isolated hole grown by the pixel pattern 666. Pixel patterns 664 and 666 in the third tier 650 of FIG. 6 are cases in which the current or target pixel is already OFF (i.e., pixel has a low binary value value of "0") and is part of a three pixel hole. The pixel patterns 664 and 666 are used to grow next pixel as a hole for a 4-pixel holegrowth by setting the flag growNext, which is set to "0" in the beginning of a scan line and when the two patterns are not satisfied. If growTo is set to FOUR and the flag growNext is ON then the target pixel (which is the next pixel for pixel C as shown in 664 and 666) is turned OFF.

In another embodiment, a similar effect can be achieved by expanding the context window in the fast scan direction.

Next at procedure 314, the isolated hole including the turned OFF target pixel is output as an output image. In one embodiment, the isolated hole including the turned OFF target pixel is output on a printable medium as an output image. In another embodiment, the isolated hole including the turned OFF target pixel is output as an output digital image.

As will be appreciated by one of ordinary skill in the art, additional criteria may be applied toward determining whether or not center pixel 204 will be detected for hole growth. For example, such additional criteria are disclosed in the concurrently filed applications, U.S. application Ser. No. 13/547,839, filed Jul. 12, 2012, now U.S. Pat. No. 8,665,499, titled "Isolated Hole Detection And Growth," and U.S. application Ser. No. 13/547,875, filed Jul. 12, 2012, now U.S. Pat. No. 8,643,905, titled "Isolated Hole Detection And Growth," are assigned to the same assignee of the present application. The entire disclosure of these co-pending applications is incorporated herein by reference in its entirety.

The present disclosure, thus, provides a method of using tiered template matching in a context binary window to grow the isolated holes when isolated hole pixels are found in an image. The present disclosure provides a simple and an effective way to remove isolated holes from an image by growing the isolated holes to a two, three or four pixel minimum size. The present disclosure provides a new circuit implementation that is able to grow a hole by one, two or three pixels in a single clock with a single memory access.

The present disclosure provides a criteria that is applied toward determining whether or not center pixel 204 will be detected for hole growth. In one embodiment, this criteria uses the inner ring 206 pixel values.

It is contemplated that the hole growth factor and the associated patterns used to detect and grow the isolated hole in the above description are exemplary. They can be scaled up or down in different embodiments.

Various aspects of the present disclosure effectively deal with fixing the marking engine imaging problems.

While the present disclosure has been described in connection with what is presently considered to be the most practical and preferred embodiment, it is to be understood that it is capable of further modifications and is not to be limited to the disclosed embodiment, and this application is intended to cover any variations, uses, equivalent arrangements or adaptations of the present disclosure following, in general, the principles of the present disclosure and including such departures from the present disclosure as come within known or customary practice in the art to which the present disclosure pertains, and as may be applied to the essential features hereinbefore set forth and followed in the spirit and scope of the appended claims.

What is claimed is:

1. A computer-implemented method for detecting and growing isolated holes in a document image having a plurality of pixels, wherein the method is implemented in a computer system comprising one or more processors configured to execute one or more computer program modules, the method comprising:

receiving a document image having a plurality of pixels therein;

isolating the pixels of the received image to form a plurality of windows, each window comprising a target pixel and a plurality of pixels surrounding the target pixel;

detecting an isolated hole in the received image;

identifying a hole growth factor to grow the detected isolated hole in the received image;

using the hole growth factor to identify tiered pixel patterns from a plurality of predefined, tiered pixel patterns, wherein each of the tiered pixel patterns having a predetermined hole growth factor;

comparing the pixels within each window to the pixel patterns within the identified tier to identify a match between the pixels within the window and at least one of the pixel patterns; and changing a pixel value of the target pixel, when a match is identified, to grow the detected isolated hole in the image by the hole growth factor.

2. The method of claim 1, wherein the predetermined hole growth factor is configured to grow the detected isolated hole by at least two pixel size.

3. The method of claim 2, wherein the predetermined hole growth factor is configured to grow the detected isolated hole by a two pixel size, a three pixel size or a four pixel size.

4. The method of claim 1, wherein the changing the pixel value of the target pixel includes turning OFF the target pixel.

5. The method of claim 4, further comprising outputting the isolated hole including the turned OFF target pixel on a printable medium as an output image.

6. The method of claim 1, further comprising a plurality of mask patterns to augment the pixel patterns, each mask pattern corresponds to the pixel pattern.

7. A system for detecting and growing isolated holes in a document image having a plurality of pixels, the system comprising:

an image input device configured for receiving a document image having a plurality of pixels therein; and a processor configured for:

isolating the pixels of the received image to form a plurality of windows, each window comprising a target pixel and a plurality of pixels surrounding the target pixel;

detecting an isolated hole in the received image;

identifying a hole growth factor to grow the detected isolated hole in the received image;

using the hole growth factor to identify tiered pixel patterns from a plurality of predefined, tiered pixel patterns, wherein each of the tiered pixel patterns having a predetermined hole growth factor;

comparing the pixels within each window to the pixel patterns within the identified tier to identify a match between the pixels within the window and at least one of the pixel patterns; and changing a pixel value of the target pixel, when a match is identified, to grow the detected isolated hole in the image by the hole growth factor.

8. The system of claim 7, wherein the predetermined hole growth factor is configured to grow the detected isolated hole by at least two pixel size.

9. The system of claim 8, wherein the predetermined hole growth factor is configured to grow the detected isolated hole by a two pixel size, a three pixel size or a four pixel size.

10. The system of claim 7, wherein the changing the pixel value of the target pixel includes turning OFF the target pixel.

11. The system of claim 10, further comprising an image output device configured for outputting the isolated hole including the turned OFF target pixel on a printable medium as an output image.

12. The system of claim 7, further comprising a plurality of mask patterns to augment the pixel patterns, each mask pattern corresponds to the pixel pattern.

* * * * *